(12) United States Patent
Young et al.

(10) Patent No.: US 7,837,001 B2
(45) Date of Patent: Nov. 23, 2010

(54) DUAL HYDROSTATIC VEHICLE STEERING SYSTEM

(75) Inventors: Richard Frederick George Young, Uttoxeter (GB); Christopher James Yates, Stoke on Trent (GB); Gregory Peter Fitton, Stoke on Trent (GB); Charles David Nicklin, Sandbach (GB)

(73) Assignee: JCB Landpower Limited, Rocester, Uttoxeter, Staffordshire (GB)

( * ) Notice: Subject to any disclaimer, the term of this patent is extended or adjusted under 35 U.S.C. 154(b) by 293 days.

(21) Appl. No.: 12/104,930

(22) Filed: Apr. 17, 2008

(65) Prior Publication Data

US 2008/0271941 A1 Nov. 6, 2008

(30) Foreign Application Priority Data

May 3, 2007 (GB) ................................. 0708534.3

(51) Int. Cl.
*B62D 5/08* (2006.01)
(52) U.S. Cl. ........................................ 180/441; 180/442
(58) Field of Classification Search ................. 180/405, 180/406, 410, 441, 442, 421, 414, 419
See application file for complete search history.

(56) References Cited

U.S. PATENT DOCUMENTS

| | | | |
|---|---|---|---|
| 3,730,288 A | 5/1973 | Dean | |
| 4,028,997 A * | 6/1977 | Lang | 91/517 |
| 4,184,332 A * | 1/1980 | Liebert | 60/386 |
| 4,257,311 A | 3/1981 | Barnsley et al. | |
| 4,372,413 A * | 2/1983 | Petersen et al. | 180/432 |
| 4,934,474 A | 6/1990 | Sugasawa | |
| 6,131,389 A * | 10/2000 | Sørensen | 60/384 |
| 6,209,677 B1 * | 4/2001 | Bohner et al. | 180/406 |
| 6,386,312 B1 * | 5/2002 | Sevelsted | 180/417 |
| 2001/0004032 A1 | 6/2001 | Zenker et al. | |

FOREIGN PATENT DOCUMENTS

WO     03047949 A1     6/2003

* cited by examiner

*Primary Examiner*—Tony H. Winner
(74) *Attorney, Agent, or Firm*—MacMillan, Sobanski & Todd, LLC

(57) ABSTRACT

A vehicle including a steering system for moving a pair of wheels supported by a wheel support structure relative to a vehicle structure to achieve steering of the vehicle whilst the vehicle is travelling. The system including a pressure source for providing a supply of pressurized fluid through first and second steering valves to fluid operated first and second actuators, each of which includes an actuating member. The steering valves are operator controlled to provide the pressurized fluid, at least when the steering system is in a first operating mode, from both the first steering valve to the first actuator and from the second steering valve to the second actuator to achieve steering. When the steering system is operating in a second operating mode, only one of the first and second steering valves provides pressurized fluid from the source to a respective one of the actuators to achieve steering.

9 Claims, 5 Drawing Sheets

DUAL HYDROSTATIC VEHICLE STEERING SYSTEM

CROSS-REFERENCE TO RELATED APPLICATIONS

Priority is claimed to United Kingdom patent application Serial No. 0708534.3 filed May 3, 2007.

STATEMENT REGARDING FEDERALLY SPONSORED RESEARCH OR DEVELOPMENT

Not Applicable.

TECHNICAL FIELD

This invention relates to a vehicle and more particularly but not exclusively to a vehicle which is designed in use, to be driven on-road, but which also may be driven off-road. The invention will be described in relation to a tractor, but the invention may be applied to multifarious other vehicles, by which term we include working machines which may have a working arm to perform working operation but which are drivable over the ground on a ground engaging structure.

BACKGROUND OF THE INVENTION

Other than relatively slow speed vehicles, e.g. vehicles such as conventional tractors which are capable of road speeds up to a maximum of 50 kph, have been required by safety legislation in some countries to have a steering system which is mechanical in nature, although this may be power assisted. Thus in the event of power failure, the vehicle may still be steered. The legislation in at least some countries is or has been modified, such that hydraulic steering systems may be used, but only provided that there is some back-up facility for achieving steering in the event of steering system hydraulic component failure. Such legislation has applied to vehicles such as tractors, which are capable of road speeds of say, up to 80 kph. Hence higher speed tractors necessarily have been provided with mechanical, power assisted steering systems.

Conventional slower speed vehicles which are intended to be driven off-road e.g. during tractor working operations, have traditionally been provided with steering systems which are hydraulic in nature, including hydraulic actuators to swivel wheels of the vehicle to achieve steering. Mechanical and hydraulic steering systems have different characteristics. Operators tend to prefer hydraulic steering when driving such vehicles off-road.

BRIEF SUMMARY OF THE INVENTION

According to a first aspect of the invention we provide a vehicle including a steering system for moving a pair of wheels supported by a wheel support structure relative to a support structure to achieve steering of the vehicle whilst the vehicle is travelling. The system may include a pressure source for providing a supply of pressurised fluid, to first and second steering valves, and first and second fluid operated actuators each of which includes an actuating member, the steering valves each being operator controlled to provide the pressurised fluid, at least when the steering system is in a first operating mode, from the first steering valve to the first fluid operated actuator and from the second steering valve to the second fluid operated actuator to achieve steering. When the steering system is operating in a second operating mode, one only of the first and second steering valves may provide pressurised fluid from the pressure source to a respective one only of the fluid operated actuators to achieve steering.

Thus in the event of fluid component failure which results in pressurised fluid not being available for supply to both the first and second fluid operated actuators, the other of the first and second fluid operated actuators is still operative. Thus the present invention provides a vehicle with a fluid actuated steering system in which in the event of failure of a pressurised fluid component of the system, a steering capability is still provided.

In one example, where the wheels are supported by a wheel support structure including respective hubs which are swivellable relative to the remainder of the wheel supporting structure, each actuating member may be mechanically coupled to the hubs of both wheels of the pair. Because both of the fluid operated actuators are mechanically coupled to the hubs or the wheel support structure, in the event of one of the fluid operated actuators failing, i.e. becoming incapable of moving its actuating member under power, the other of the first and second actuators will be capable of achieving steering.

In another example, the wheels may be supported by the wheel supporting structure, with the wheel supporting structure being pivotable relative to the vehicle structure, to effect steering, the actuating member of the first and second actuators each being mechanically coupled to the wheel support structure. Again, in the event of failure of one of the fluid operated actuators to be able to move the wheel support structure, the other actuator will be capable of performing steering.

In each case, such failure may be as a result of failure of one of the fluid operated actuators or of a fluid carrying line between one of the steering valves and the respective fluid operated actuator, or due to the loss of fluid pressure upstream of a steering valve.

The pressure source may include first and second pumps for pressurising fluid. Each of the first and second pumps may be driven from a prime mover such as an engine of the vehicle. In the event of failure of either one of the pumps, it will be appreciated that the other or others of the plurality of pumps may continue to supply pressurised to a respective steering valve.

The steering system may include a valve structure between the steering valves and the fluid operated actuators, which in the event of failure of the supply of pressurised fluid, operates to provide a fluid path from one only of the first and second steering valves to both of the fluid operated actuators.

For example, the valve structure may include a valve member, such as spool, which is moveable by the upstream pressurised fluid where available, to provide fluid paths for pressurised fluid from each of the steering valves to respective fluid operated actuators, but in the absence of sufficient fluid pressure, the valve member moves to a position to establish the fluid path from the one steering valve to each of the first and second fluid operated actuators.

The steering system may include an operator control such as a steering wheel which when turned or otherwise moved, moves operating parts of each of the steering valves which at least when the steering system is operating in the first mode of operation, each meter the provision of the pressurised fluid to the respective fluid operated actuator, as is well known in the art, so that the degree of steering of the vehicle is dependent upon the degree of rotation or other movement of the steering control.

Preferably the steering valves are each of the kind in which the metering of fluid is dependent upon the movement of the steering control so that in the event of failure of supply of pressurised fluid from the pressure source, for example if a prime mover driving the pressure source stops or fails, the steering system operates in a third operational mode, in which upon the steering control being moved, fluid will be provided to the valve structure and hence to both of the fluid operated actuators, albeit at a pressure which will need to be generated by the operator by moving the steering control, and so some steering, at least sufficient to enable the operator to control the vehicle while the vehicle is brought to a standstill, may be achieved.

It will be appreciated that the amount of fluid metered by such a steering valve when the operating part is moved, as well as depending upon the movement of the operating part of each steering valve, depends upon the pressure of the fluid being supplied to the steering valve. Accordingly a greater movement of the operating part, e.g. increased degree of rotation of the steering wheel where the steering control is a steering wheel, would be required in the event of pressure source failure, compared to during the normal first mode of operation when the pressure source, e.g. at least one of the pumps is operative, to achieve the same degree of steering. Where the pressure source includes a pair of pumps, the pumps may pressurise fluid from a reservoir, and one or more lines may be provided for fluid from the steering system to be returned to the reservoir after use.

Desirably the reservoir includes a first reservoir part and a second reservoir part, the reservoir parts being separated from one another, the first pump pressurising fluid from the first reservoir part and the first reservoir part receiving fluid returned from the first steering valve, and the second pump pressurising fluid from the second reservoir part and the second reservoir part receiving returned fluid from the second steering valve. Hence in the event of a loss of fluid from either of the reservoir parts, fluid will still be available to one of the steering valves and hence fluid operated actuators to effect steering of the vehicle.

In one embodiment, where the wheels are supported by swivellable hubs, the first and second fluid operated actuators are arranged between and coupled to the hubs of each of the pair of wheels to operate in parallel. In another embodiment the first fluid operated actuator is connected to the first hub and the second fluid operated actuator is connected to the second hub with there being a connecting member between the hubs. In another example the first fluid operated actuator is connected to the first hub and the second fluid operated actuator is connected to the second hub, each fluid operated actuator including an actuating part, the actuating parts of the first and second fluid operated actuators being connected together. In all cases both fluid operated actuators are mechanically coupled to both of the hubs whereby movement of an actuating part of either of the fluid operated actuators effects swiveling movement of both of the hubs.

The hubs of the swivellable pair of wheels may be part of a wheel support structure which includes an axle. Where the wheels are supported by a wheel support structure which is pivotable relative to the vehicle structure, in normal operation, the actuating members may act on opposite sides of the pivot axis with one actuating member pushing and the other pulling.

According to a second aspect of the invention we provide a steering system for the vehicle of the first aspect of the invention.

DETAILED DESCRIPTION OF THE INVENTION

Figure 1:
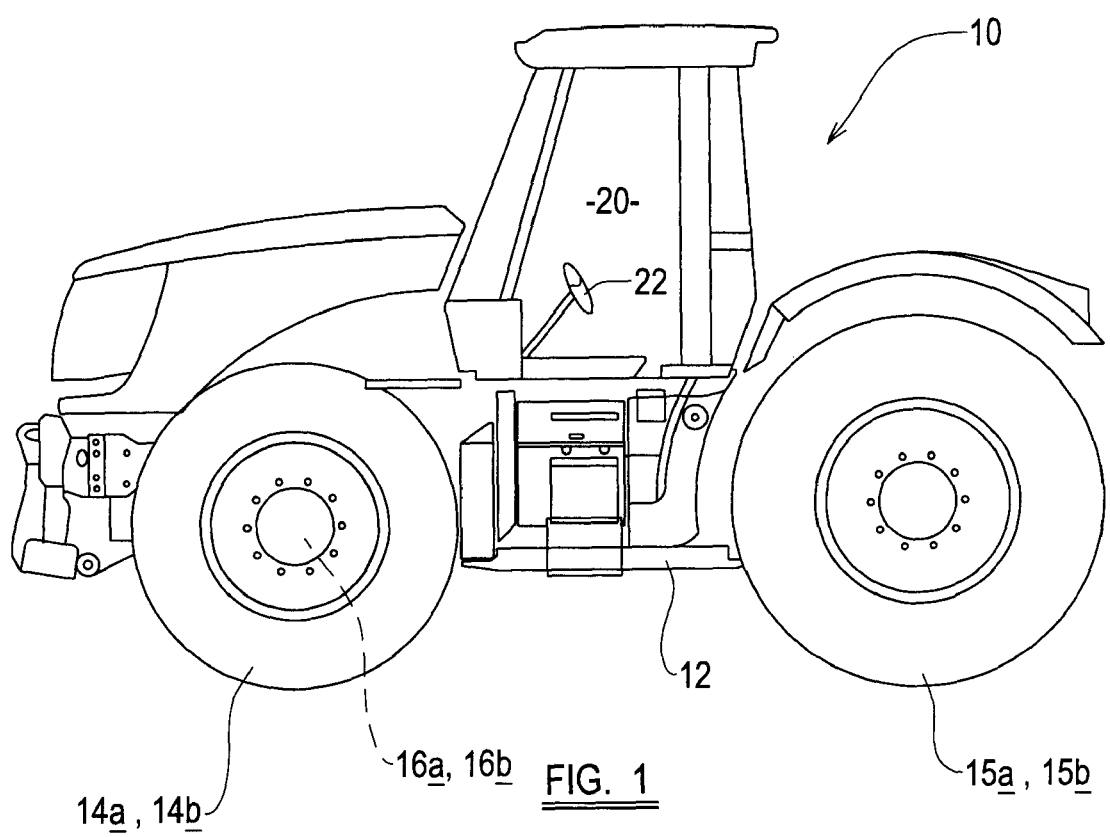
FIG. 1 is an illustrative side view of a tractor in accordance with the present invention.

Referring to the drawings there is shown a vehicle 10 which in the present example is a tractor, having a frame 12 which includes a chassis and body, and a suspended ground engaging structure provided by two pairs of wheels namely front wheels 14a, 14b and rear wheels 15a, 15b. In this example, the front wheels 14a, 14b only are steerable, but in another example all wheels may be steerable, but the invention is concerned primarily with steering of the vehicle on-road for which two-wheel steering will be selected.

In this example, the front wheels 14a, 14b are each carried by a wheel support structure S which includes for each wheel 14a, 14b, a respective hub 16a, 16b. The wheel support structure further including in the present example, a front axle 18, but in another example, the hubs 16a, 16b may be supported on suspension links from the chassis or otherwise. The hubs 16a, 16b are swivellable relative to the axle 18 about respective generally upright axes A, B to effect steering of the vehicle 10 when the vehicle 10 is travelling over the ground. Steering is performed by an operator within an operator's cab 20, by the operator moving a steering control which is this example is a steering wheel 22 which is shown in FIG. 2.

Figure 2:
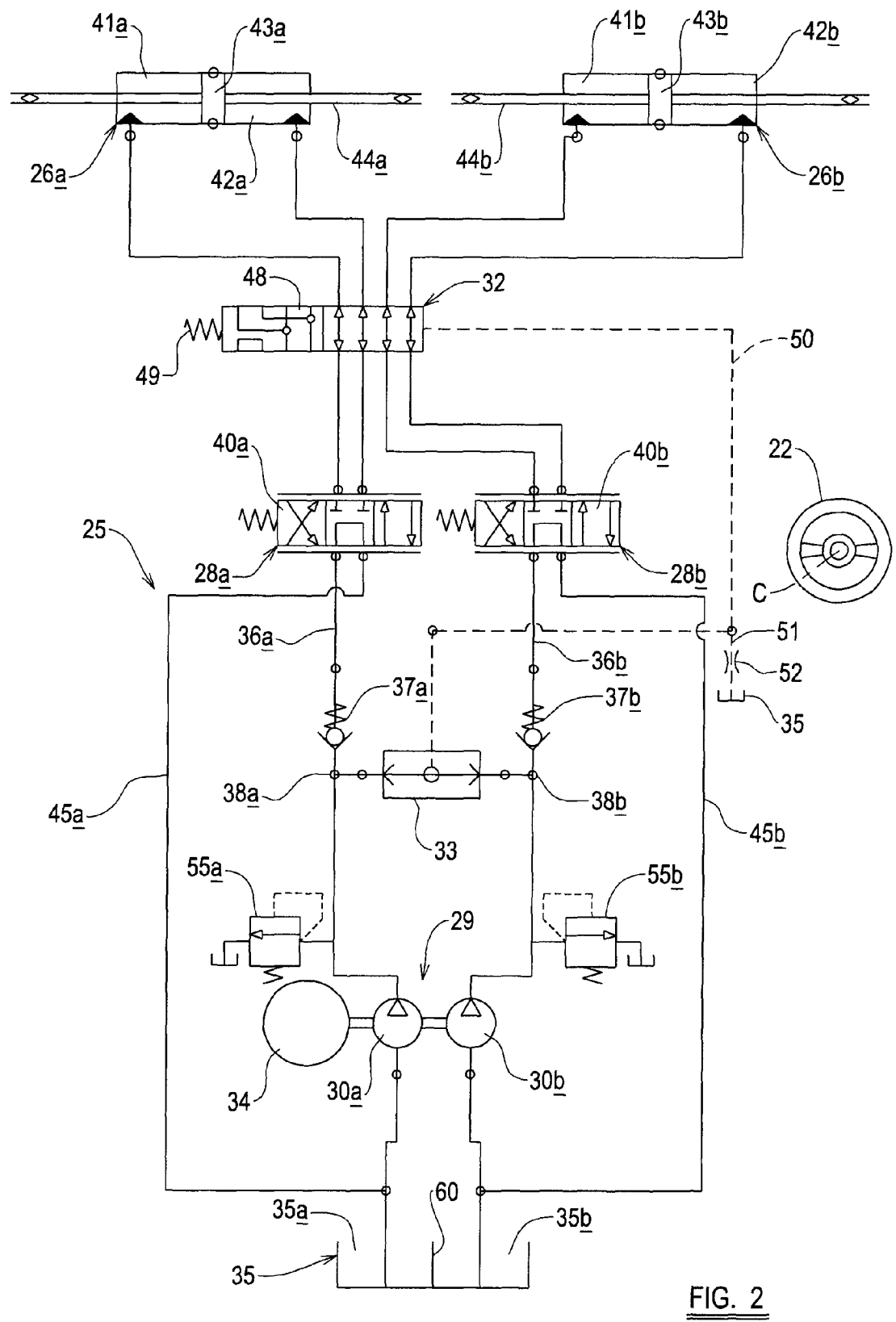
FIG. 2 is an illustrative diagram of a steering system for a vehicle in accordance with the invention.

Referring now more particularly to FIG. 2, a steering system 25 is illustrated. The system 25 is shown simplified, but the major components are first and second fluid operated actuators 26a, 26b, first and second steering valves 28a, 28b, and a pressure source 29 which is this example is a pair of pumps 30a, 30b. The system 25 also includes a valve structure 32 between the steering valves 28a, 28b and the fluid operated actuators 26a, 26b, and a shuttle valve 33. In this example, the first and second pumps 30a and 30b are both driven from an engine 34 of the vehicle 10 directly as shown, or through a transmission or transmissions. The first pump 30a pressurises hydraulic fluid from a reservoir 35, and provides the pressurised fluid via a supply line 36a to the first steering valve 28a. Within the supply line 36a there is a non-return valve 37a just downstream of a connection 38a with the shuttle valve 33. The non-return valve 37a is biased to open to allow pressurized fluid into the supply line 36a at a preset pressure so that adequately pressurised fluid is always available to the shuttle valve 33, to ensure an adequate pressure in a pilot line 50 to operate the valve structure 32 as described below.

The first steering valve 28a includes an operating part 40a which for illustrative purposes is shown as a spool, which is moveable by the operator turning the steering wheel 22. Depending on the extent and direction of steering wheel 22 movement and the upstream fluid pressure, at least in a first, normal, mode of operation, the first steering valve 28a meters the pressurised hydraulic fluid flow to the first fluid operated actuator 26a via the valve structure 32 as will be described below.

The first fluid operated actuator 26a is of the double acting kind, the pressurised fluid being fed to one or other of a pair of chambers 41a, 42a, thus to move a piston 43a which is connected to an actuating part 44a, to be moved linearly in the chambers 41a, 42a. Fluid which is ejected from the other of the chambers 42a, 41a, is fed back through the valve structure 32 and first steering valve 28a, and via a return line 45a to the reservoir 35. The second fluid operated actuator 26b is actuated similarly to the first fluid operated actuator 26a, with the second pump 30b pressurising fluid from the reservoir 35, and providing the pressurised fluid along a supply line 36b (which includes a non-return valve 37b similar to non-return valve 37a) to the second steering valve 28b.

Operating parts 40a, 40b of both of the first and second steering valves 28a, are moved together in synchronism by the steering wheel 22 being rotated, so that simultaneously with the actuating member 44a of the first fluid operated actuator 26a being moved linearly, the actuating member 44b of the second fluid operated actuator 28b is moved, and both in the same linear direction. Return fluid from the second fluid operated actuator 28b returns to the reservoir 35 via a return line 45b.

It will be appreciated that so far, there are two separate, but mirrored circuits are described, one for operating the first fluid operated actuator 26a, and the other for operating the second fluid operated actuator 26b. Unless otherwise explained, counterparts in the second circuit including the second pump 30b, of components described for the first circuit including the first pump 30a etc., are indicated by the same numeral but with a "b" instead of an "a" suffix.

The valve structure 32 shown in FIG. 2 includes a valve member 48 which is this example is a spool which is biased by a mechanical spring 49 to the right as seen the drawing. Thus the valve member 48 is drawn in a position in which it is urged against the force of the mechanical return spring 49, this being achieved by a pilot fluid pressure provided from the shuttle valve 33, which passes to the valve structure 32 via a pilot passage 50. To enable the rapid relief of pressure from the pilot line 50 to enable valve member 48 to be moved by the spring 49, in the event of a fluid supply pressure failure for example, as described below, there is a path 51 for pressurised fluid from the pilot line to the reservoir, via a restrictor 52.

Figure 2A:
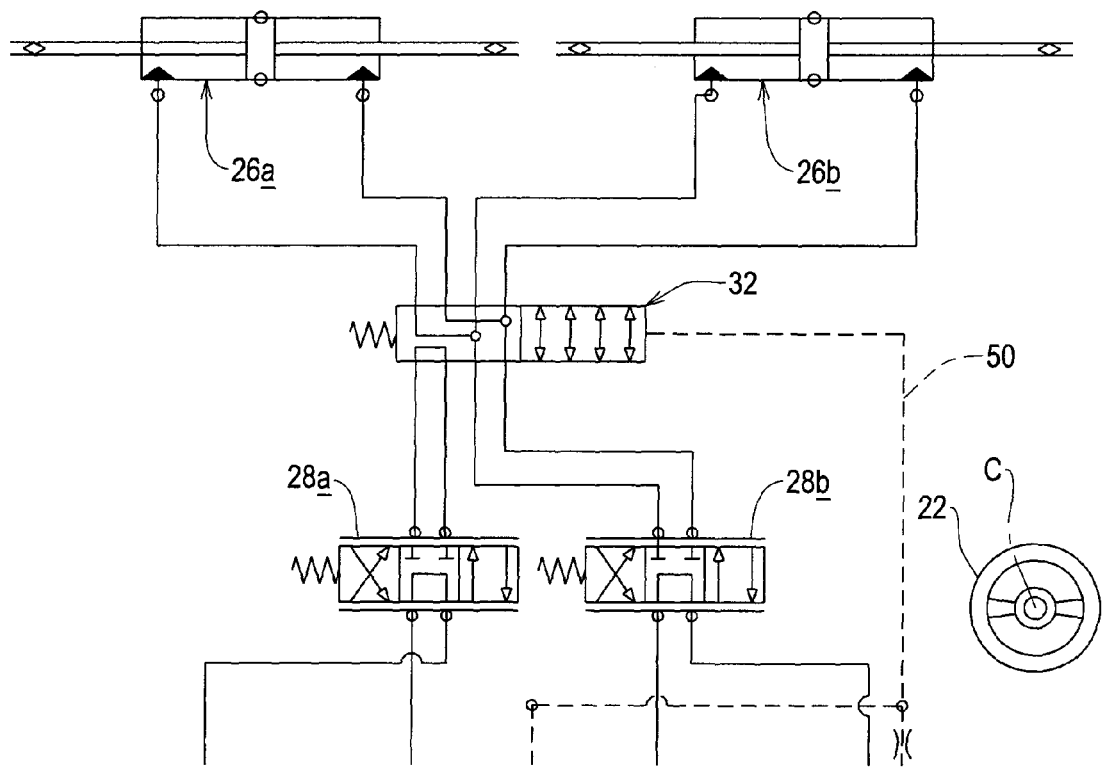
FIG. 2a is a view similar to FIG. 2 but showing a valve structure in an alternative position.

The valve member 48 of the valve structure 32, when in the position shown when the pilot pressure is provided, permits the flow of pressurised fluid between the respective steering valves 28a, 28b and the fluid operated actuators 26a, 26b. In the absence of the pilot pressure, the valve member 48 will move to the right as seen in the drawings, to the position shown in FIG. 2a, in which position the passage of fluid from the first steering valve 28a to and from the first fluid operated actuator 26a is prevented, but fluid may flow from the second steering valve 28b to and from both fluid operated actuators 26a, 26b to move the pistons 43a, 43b thereof, and hence the actuating parts 44a, 44b thereof, in the same directions.

The shuttle valve 33 receives fluid pressure from either/both of the supply lines 36a, 36b at 38a, 38b. When there is pressure in either of the supply lines 36a, 36b, fluid may enter the shuttle valve 33 and thus provide the pilot pressure in the pilot pressure line 50. Thus the valve member 48 of the valve structure 32 will move to the FIG. 2A position in opposition to the biasing spring 49. In the absence of pressure in say, supply line 36a, the shuttle valve connection 38a will close, but provided that fluid pressure is still available from the other supply line 36b, the valve member 48 of the valve structure 32 will still receive the pilot pressure and assume the position shown in FIG. 2. Each of the supply lines 36a, 36b includes a respective pressure relief valve 55a, 55b to relieve excess pressure in the supply lines 36a, 36b to the reservoir 35.

Figure 3:
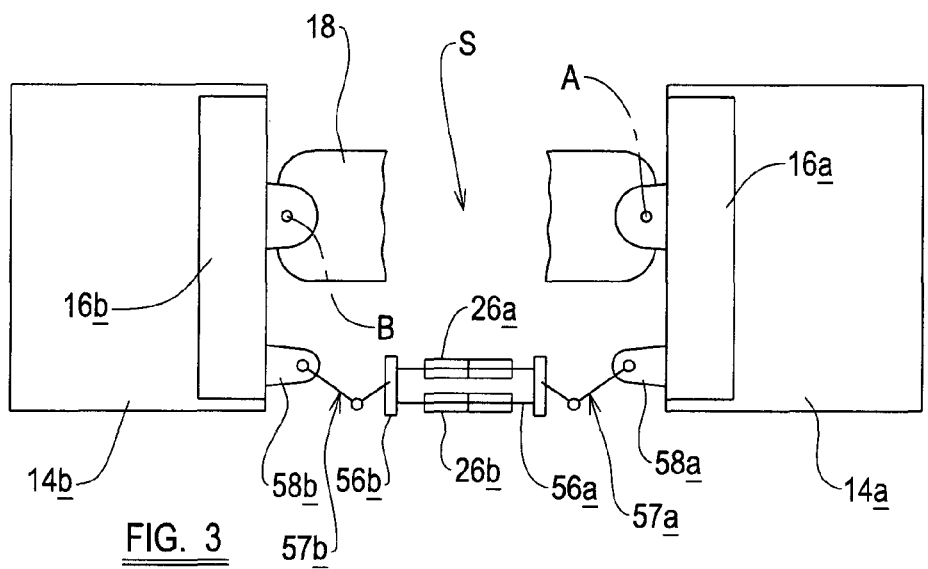
FIG. 3 is an illustrative front view of part of one embodiment of tractor in accordance with the invention.
Figure 4:
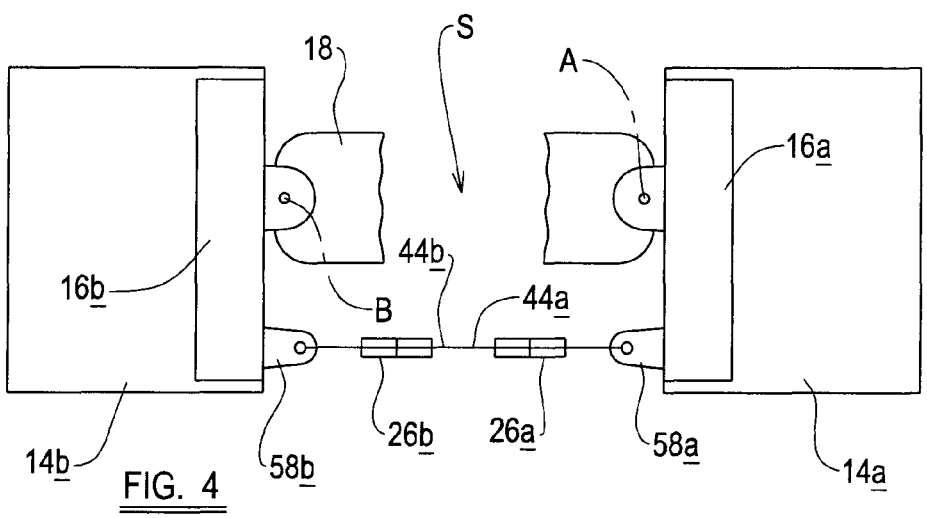
FIG. 4 is a view similar to FIG. 3 but of an alternative embodiment.

Referring now to FIGS. 3 and 4, two alternative configurations of the vehicle 10 are shown. In FIG. 3, it can be seen that the first and second fluid operated actuators 26a, 26b are arranged in parallel between the hubs 16a, 16b to be swiveled to effect steering. Both of the respective actuating parts 44a, 44b are fixed at each end to connectors 56a, 56b and respective steering linkages 57a, 57b, to respective swivels 58a, 58b of the hubs 16a, 16b. Thus the actuating parts 44a, 44b of the fluid operated actuators 26a, 26b are each mechanically coupled to both of the hubs 16a, 16b. The actuating parts 44a, 44b will move linearly together in the same directions to effect steering of the vehicle 10.

In FIG. 4 it can be seen that the actuating parts 44a, 44b of the fluid operated actuators 26a, 26b are connected in series between the hubs 16a, 16b, with the actuating part 44a of the first fluid operated actuator 26 being connected at one end to the swivel 58a of the first hub 16a, and at its other end to one end of the second actuating part 44b, whilst the other end of the second actuating part 44b is connected to the swivel 58b of the second hub 16b. Again therefore, movement of either of the actuating parts 44a, 44b results in movement of the other actuating part 44b, 44a and swiveling movement of both of the hubs 16a, 16, in a common direction about their respective axes A, B.

Figure 4A:
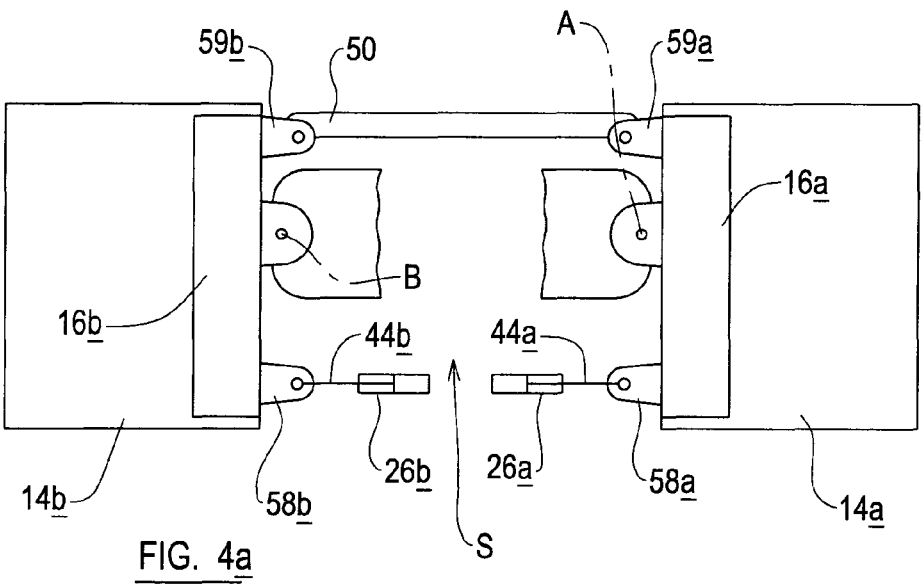
FIG. 4a is a view similar to FIG. 4 but of a modification.

In another embodiment indicated in FIG. 4a, the first and second fluid operated actuators 26a, 26b may individually be directly connected to one of the hubs 16a, 16b, only, with the actuating parts 44a, 44b not being mutually connected, but each of the actuating parts 44a, 44b of the fluid operated actuators 26a, 26b being coupled to one of the hubs 16a, 16b only, but with there being a connecting member 50 otherwise between the hubs 16a, 16b, to ensure that the hubs 16a, 16b are constrained to move in the same direction in response to movement of either of the actuating parts 44a, 44b of the fluid operated actuators 26a, 26b. In the example, the connecting member 50 is pivotally connected to a respective second swivel 59a, 59b, of the respective hub 16a, 16b which is positioned on the opposite side of hub pivot axis A, B to the first mentioned swivel 58a, 58b to which the actuating parts 44a, 44b are connected.

In each of the cases described, the actuating members 44a, 44b of both of the fluid operated actuators 26a, 26b will be mechanically coupled to both hubs 16a, 16b, directly as in FIG. 3, or indirectly as in FIG. 4 and FIG. 4a. In a normal first mode of operation, steering of the front wheels 14a, 14b is effected by an operator turning the steering wheel 22, thus operating both of the steering valves 28a, 28b to meter pressurised fluid to both of the respective fluid operated actuators 26a, 26b. In the event of a fault, depending upon the nature of the fault, the steering system 25 is operable in second or third operating modes.

In the event of a failure of a hydraulic fluid component such as a burst or leaking supply line 36a, 36b between a pump 30a, 30b and a steering valve 28a, 28b, or in any line between the steering valves 28a, 28b and the fluid operated actuators 26a, 26b, such that pressurised fluid to one or others of the fluid operated actuators 26a, 26b is unavailable, steering may be effected still by the other of the steering valves 28b, 28a providing pressurised fluid to the other of the fluid operated actuators 26b, 26a, which will operate to swivel both of the hubs 16a, 16b through the mechanical coupling described above. In this second mode of operation, the operating part 40b, 40a of the ineffective steering valve 28b, 28a will still be moved by the steering wheel 22 movement, and thus a path for ejected fluid from relevant chamber 41a, 41b; 42a, 42b of the unpressurised fluid operated actuator 26a, 26b will still be provided through the ineffective steering valve 28b, 28a.

The steering system 25 described is therefore capable, in the second operating mode, of giving an operator near full steering ability in the event of a failure of any of the hydraulic components of either the first circuit including the first pump 30*a* or the second circuit including a second pump 30*b*, or at least sufficient steering capability to bring the vehicle 10 to rest under control. In the event of the complete failure of the pressure source e.g. simultaneous failure of both of the first and second pumps 30*a*, 30*b*, e.g. due to the failure of the engine 34, the steering system 25 still enables of some steering capability with the steering system 25 operating in a third operational mode.

Steering valves 28*a*, 28*b* of the kind described, which are intended to meter the supply of pressurised fluid through the valves 28*a*, 28*b*, when the operating part 40*a*, 40*b* thereof is moved by the steering control 22, are capable of performing as low pressure pumps to pump available hydraulic fluid, e.g. returning hydraulic fluid ejected from a chamber 41*a*, 41*b* or 42*a*, 42*b* of the fluid operated actuators 26*a*, 26*b*, back to the other chamber 41*a*, 42*b* or 41*a*, 41*b* of the respective fluid operated actuators 26*a*, 26*b*. As the pressure will be low pressure fluid, and the pressure will depend upon the movement of the operating parts 40*a*, 40*b* of the steering valves 28*a*, 28*b*, it will be appreciated that an operator may well have to turn the steering wheel 22 or otherwise move the steering control, to a greater extent than where pressurised fluid is available, to achieve a desired degree of steering.

For example in the first operating mode, full lock steering may be achieved by less than three full rotations of the steering wheel 22 about its steering axis C, whereas in the third operational mode, twice this number of turns or more may be required to achieve full lock steering. However, as failure of the pressure source 29 would constitute an emergency condition, desirably steering in the third operational mode would only be effected to bring the vehicle 10 under control to a standstill upon brake actuation.

For example, the steering valves 28*a*, 28*b* may each be of the type sold under the designations "Ognibene St, STX, MSTX steering Units". A pair of these steering units may be coupled together so that steering wheel 22 movement operates both steering units of the pair to deliver the functionality described. If desired, both steering units of the pair may conveniently be accommodated in a common valve block.

In the third operational mode, it will be appreciated that a supply of pressurised fluid to the shuttle valve 33 will not be available, and accordingly the valve member 48 of the valve structure 32 will be moved by the mechanical spring 49 to the right as seen in the drawings, so that the limited pressure fluid pumped by the steering wheel 22 movement as described, will be transmitted to the chambers 41*a*, 41*b* or 42*a*, 42*b* at the same sides of both of the pistons 43*a*, 43*b* of both of the fluid operated actuators 26*a*, 26*b*, so that no one of the fluid operated actuators 26*a*, 26*b*, with the limited fluid pressure available, needs to drive the actuating member 44*b*, 44*a* of the other of the fluid operated actuators 26*b*, 26*a*.

Various modifications are possible without departing from the scope of the invention. For example, although as described, both of the fluid operated actuators 26*a*, 26*b* have been described as linear actuators, these could be rotary or other actuators, provided that actuating members of both of the actuators are somehow, directly or indirectly coupled to both of the swivellable hubs 16*a*, 16*b* so that the hubs 16*a*, 16*b* are constrained to move together in response to either or both fluid operated actuator actuating part movement.

The steering valves 28*a*, 28*b* are shown illustratively in the drawn embodiments. It will be appreciated that other steering valves which operate as described, may be provided, preferably steering valves which are able to generate a fluid pressure for use in the third operating mode described. Instead of the shuttle valve 33 between the two fluid supply lines 36*a*, 36*b*, a pilot pressure to the valve structure 32 may otherwise be provided, to maintain the valve structure 32 in a position in which the steering system 25 may be operated in both the first and second operating modes, whilst a pressurised fluid supply is available.

In another example, no provision for operation in the third operating mode may be provided, in which case the shuttle valve 33 and valve structure 32 would not be provided, and a simple pump or other pressure source 29 only would be required.

In FIG. 2 it can be seen that the fluid reservoir 35 includes a first reservoir part 35*a* and a second reservoir part 35*b*, the first and second reservoir parts 35*a*, 35*b* being separated, in this example by a separating baffle wall 60. Hydraulic fluid for the first pump 30*a* is provided from the first reservoir part 35*a* and fluid for the second pump 30*b* is provided from the second reservoir part 35*b*. Also, fluid returning from the first steering valve 28*a* via return line 45*a*, is returned to the first reservoir part 35*a*, and fluid returning from the second steering valve 28*b* via return line 45*b*, is returned to the second reservoir part 35*b*. In this way, in the event of fluid depletion in either reservoir part 35*a*, 35*b*, e.g. from a burst fluid line of either circuit, a separate supply of fluid will still be available from the other reservoir part 35*b*, 35*a*.

In order to provide some warning to an operator of a problem with the steering circuit, if desired, flow/pressure sensors may be provided at various points of the fluid circuits, the sensors signalling a visual and/or aural warning to the operator in the event that a fault is detected.

For example pressure sensors may be provided in each flow and return line of the fluid operated actuators 26*a*, 26*b* to sense any loss of integrity of the respective fluid lines, and if necessary, the flow and return lines of the steering valves 28*a*, 28*b* may each include directional flow valves to maintain a minimum pressure in the lines at least during operation in the normal operational mode. Pressure sensors may be provided in the supply lines 36*a*, 36*b* between the pressure source 29 and the steering valves 28*a*, 28*b* and/or in the return lines 45*a*, 45*b* between the steering valves 28*a*, 28*b* and the reservoir 35, again to indicate any loss of integrity of those lines. In another example, a switch sensitive to the position of spool valve 32 may provide a warning to an operator, when the spool of valve 32 has moved to change the operating mode of the steering system to the third operating mode.

In other example (not shown) instead of the pair of wheels 14*a*, 14*b* being supported by swivellable hubs 16*a*, 16*b* of a wheel support structure S, the wheels 14*a*, 14*b* may be supported by a wheel support structure which is pivotable about a generally upright axis at least, relative to a vehicle structure which may mount the engine 34, operator's cab etc. However, the wheel support structure may mount major components of the vehicle, such as the engine and/or cab as required.

Figure 5:
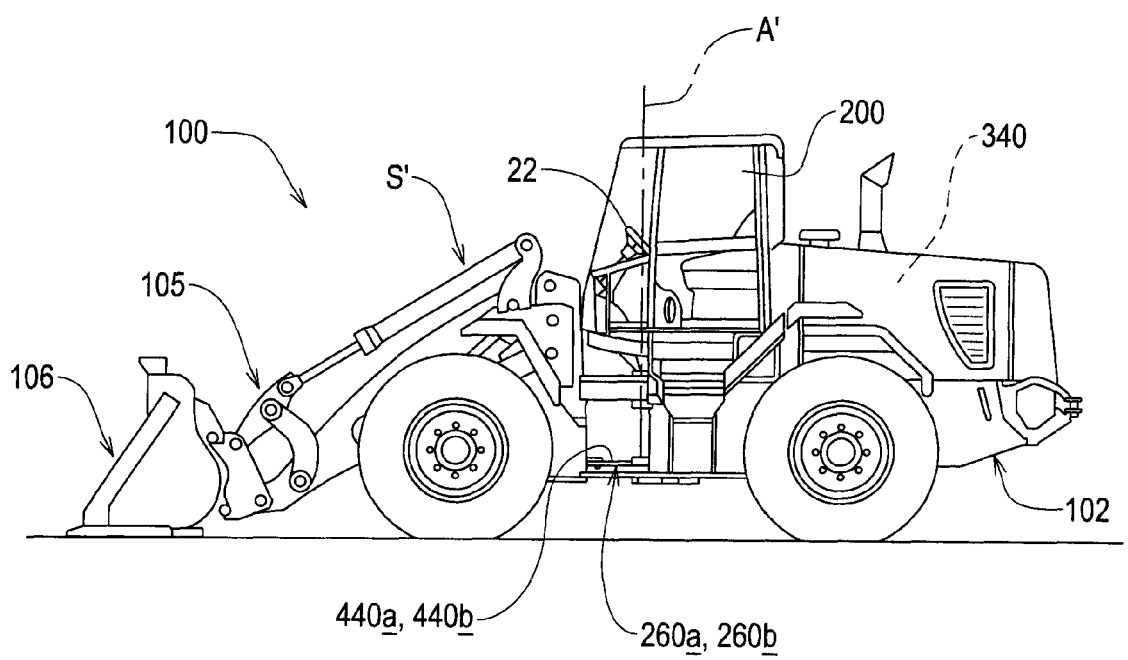
FIG. 5 illustrates an articulated vehicle embodying the invention.

In FIG. 5 an example of a vehicle 100 is shown in which a wheel support structure S', is the front vehicle structure of an articulated vehicle 100. A rear vehicle structure 102 mounts the engine 340, operator's cab 200 etc. The wheel support structure S' is pivotal about a generally upright axis A', relative to the rear vehicle structure 102, by virtue of a pair of steering actuators 260*a*, 260*b*. In this example, actuating members 440*a*, 440*b* of the actuators 260*a*, 260*b* are mechanically (pivotally) coupled between the rear vehicle structure 102 and the wheel support structure S', either side of, but if desired at the same side of, the pivot axis A'. Thus the actuators 260*a*, 260*b* are operative respectively to "push" and "pull" the wheel support structure S' relative to the rear vehicle structure S', to effect steering and by virtue of the invention, steering may be effected in the event of component failure, by either one of the actuators 260a, 260b. If desired the wheel support structure S' may be at the rear of the vehicle 100, pivoted to a front vehicle structure 102 which mounts the engine 340 etc. The vehicle 100 in this example is of the kind having working arm 105 which mounts a bucket 106 or other working implement, and in the drawings is a loading machine for shoveling and loading earth for example.

It also should be appreciated that the invention may be applied to other kinds of vehicle than tractors 10 and loading machines 100, for example to machines which are used to excavate, where steering by means of hydraulic actuators is required.

The invention claimed is:

1. A vehicle including a steering system for moving a pair of wheels supported by a wheel support structure, relative to a vehicle structure to achieve steering of the vehicle whilst the vehicle is travelling, the system including a pressure source for providing a supply of pressurized fluid, to first and second steering valves, and first and second fluid operated actuators each of which includes an actuating member, the steering valves each being operator controlled to provide the pressurized fluid, at least when the steering system is in a first operating mode, from the first steering valve to the first fluid operated actuator and from the second steering valve to the second fluid operated actuator to achieve steering, and when the steering system is operating in a second operating mode, one only of the first and second steering valves providing pressurized fluid from the pressure source to a respective one only of the fluid operated actuators to achieve steering, and wherein there is a valve structure between the steering valves and the pressure source which includes a valve member which is moveable by the upstream pressurized fluid where available, to provide fluid paths for pressurized fluid from each of the steering valves to respective fluid operated actuators, but in the absence of sufficient fluid pressure, the valve member moves to a position to establish the fluid path from the one steering valve to each of the first and second fluid operated actuators.

2. A vehicle according to claim 1 wherein the pressure source includes a pair of pumps, and the pumps pressurize fluid from a reservoir, wherein at least one line is provided for fluid from the steering system to be returned to the reservoir after use, the reservoir including a first reservoir part and a second reservoir part, the reservoir parts being separated from one another, the first pump pressurizing fluid from the first reservoir part and the first reservoir part receiving fluid returned from the first steering valve, and the second pump pressurizing fluid from the second reservoir part and the second reservoir part receiving returned fluid from the second steering valve.

3. A vehicle according to claim 1 wherein the wheels are supported by a wheel support structure which includes respective hubs for the wheels, wherein the hubs are swivellable relative to the remainder of the wheel support structure, and wherein each actuating member is mechanically coupled to the hubs of both wheels of the pair by means of one of:
  first and second fluid operated actuators arranged between and coupled to the hubs of each of the pair of wheels to operate in parallel; or
  the first fluid operated actuator is connected to the first hub and the second fluid operated actuator is connected to the second hub with there is a connecting member between the hubs.

4. A vehicle according to claim 1 wherein the wheels are supported by a wheel support structure which includes respective hubs for the wheels, wherein the hubs are swivellable relative to the remainder of the wheel support structure, and each actuating member is mechanically coupled to the hubs of both wheels of the pair and the first fluid operated actuator is connected to the first hub and the second fluid operated actuator is connected to the second hub, each fluid operated actuator includes an actuating part, and wherein the actuating parts of the first and second fluid operated actuators are connected together.

5. A vehicle according to claim 1 wherein the wheels are supported by a wheel support structure which is pivotable relative to the vehicle structure about a generally upright pivot axis, and wherein the actuating members of the first and second fluid operated actuators are each mechanically coupled between the vehicle structure and the wheel support structure.

6. A vehicle according to claim 1 wherein in normal operation the actuating members act on opposite sides of the pivot axis.

7. A vehicle including a steering system for moving a pair of wheels supported by a wheel support structure, relative to a vehicle structure to achieve steering of the vehicle whilst the vehicle is travelling, the system including a pressure source for providing a supply of pressurized fluid, to first and second steering valves, and first and second fluid operated actuators each of which includes an actuating member, the steering valves are operator controlled to provide the pressurized fluid, at least when the steering system is in a first operating mode, from the first steering valve to the first fluid operated actuator and from the second steering valve to the second fluid operated actuator to achieve steering, and when the steering system is operating in a second operating mode, one only of the first and second steering valves provides pressurized fluid from the pressure source to a respective one only of the fluid operated actuators to achieve steering, and wherein the steering system includes a first valve structure between the steering valves and the fluid operated actuators which in the event of failure of the supply of pressurized fluid, operates to provides a fluid path from only one of the first and second steering valves to both of the fluid operated actuators.

8. A vehicle according to claim 7 wherein there is a second valve structure which includes a valve member which is moveable by the upstream pressurized fluid where available, to provide fluid paths for pressurized fluid from each of the steering valves to respective fluid operated actuators, and wherein in the absence of sufficient fluid pressure the valve member moves to a position to establish the fluid path from the one steering valve to each of the first and second fluid operated actuators.

9. A vehicle according to claim 7 wherein the steering system includes a steering control which when moved, moves operating parts of each of the steering valves which at least when the steering system is operating in the first mode of operation, wherein said steering valves meter the provision of the pressurized fluid to the respective fluid operated actuators so that the degree of steering of the vehicle is dependent upon the degree of rotation or other movement of the steering control, and wherein the steering valves are each of the kind in which the metering of fluid is dependent upon the movement of the steering control so that in the event of failure of supply of pressurized fluid from the pressure source, the steering system operates in a third operational mode in which upon the steering control being moved, fluid is provided to the valve structure and hence to both of the fluid operated actuators, to enable the operator to control the vehicle.

* * * * *